G. C. WOODRUFF

Jan. 5, 1932. RUNNING BOARD FOR CONTAINER CARS Re. 18,323

Original Filed May 28, 1931 7 Sheets-Sheet 1

Inventor

Graham C Woodruff

By Edwin S. Clarkson

Attorney

G. C. WOODRUFF

Jan. 5, 1932. RUNNING BOARD FOR CONTAINER CARS Re. 18,323

Original Filed May 28, 1931 7 Sheets-Sheet 2

Inventor

Graham C. Woodruff

By James S. Clarkson

Attorney

G. C. WOODRUFF

Jan. 5, 1932. RUNNING BOARD FOR CONTAINER CARS Re. 18,323

Original Filed May 28, 1931 7 Sheets-Sheet 3

Inventor

Graham C. Woodruff

By Francis S. Clarkson

Attorney

G. C. WOODRUFF

Jan. 5, 1932. RUNNING BOARD FOR CONTAINER CARS Re. 18,323

Original Filed May 28, 1931 7 Sheets-Sheet 4

Inventor

Graham C. Woodruff

By James S. Clarkson

Attorney

G. C. WOODRUFF

Jan. 5, 1932. RUNNING BOARD FOR CONTAINER CARS Re. 18,323

Original Filed May 28, 1931 7 Sheets-Sheet 5

Inventor

Graham C. Woodruff

By Edwin S. Clarkson

Attorney

G. C. WOODRUFF

Jan. 5, 1932. RUNNING BOARD FOR CONTAINER CARS Re. 18,323

Original Filed May 28, 1931 7 Sheets-Sheet 6

Inventor

Graham C. Woodruff

By Lewis S. Clarkson

Attorney

G. C. WOODRUFF

Jan. 5, 1932. RUNNING BOARD FOR CONTAINER CARS Re. 18,323

Original Filed May 28, 1931 7 Sheets-Sheet 7

Inventor

Graham C Woodruff

By Lewis S. Clarkson

Attorney

Reissued Jan. 5, 1932

Re. 18,323

UNITED STATES PATENT OFFICE

GRAHAM C. WOODRUFF, OF BRONXVILLE, NEW YORK, ASSIGNOR TO THE L. C. L. CORPORATION, A CORPORATION OF DELAWARE

RUNNING BOARD FOR CONTAINER CARS

Original No. 1,830,307, dated November 3, 1931, Serial No. 540,767, filed May 28, 1931. Application for reissue filed November 17, 1931. Serial No. 575,673.

This invention relates to safety appliances for container cars, and particularly drop side container cars, and has special reference to the provision of safety running boards and ladders for cars of this type.

One object of the invention is to provide simple, reliable and efficient means of this character to permit trainmen to pass with safety over a loaded car or string of cars, and to provide a longitudinal running board arrangement conforming to safety appliance requirements for box and other house cars.

Another object of the invention is to provide a novel construction and arrangement of end or side and end ladders in conjunction with a longitudinal running board, and if desired, with transverse running boards, whereby a car may be equipped with safety appliances of such type without interfering with the transfer of the containers to and from the car.

Still another object of the invention is to provide a safety appliance arrangement of ladders and platform or platforms which may be made of light materials without sacrifice of strength and durability, and which may be easily modified in construction for application to different forms of cars and to meet special conditions.

Still another object of the invention is to provide a construction giving full complement of safety appliances, including longitudinal and transverse running boards, side and end ladders, etc., without unduly increasing the weight added to the car.

With these and other objects in view, the invention consists of the features of construction, combination and arrangement of parts, hereinafter fully described and claimed, reference being had to the accompanying drawings, in which:—

Figure 1:
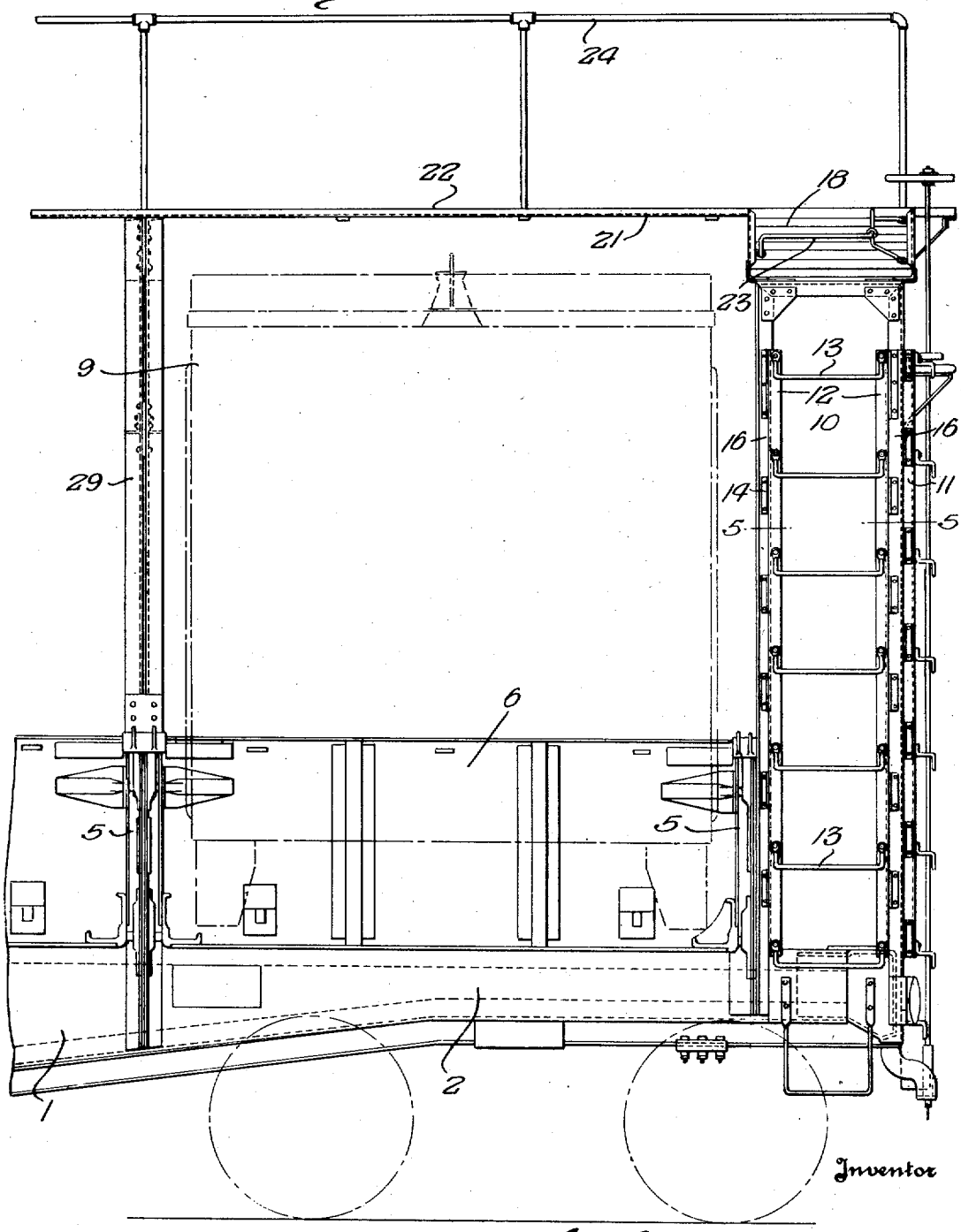
Fig. 1 is a side elevation of one end portion of a drop side container car equipped with end and side ladders and a longitudinal running board constructed in accordance with the invention.
Figure 2:
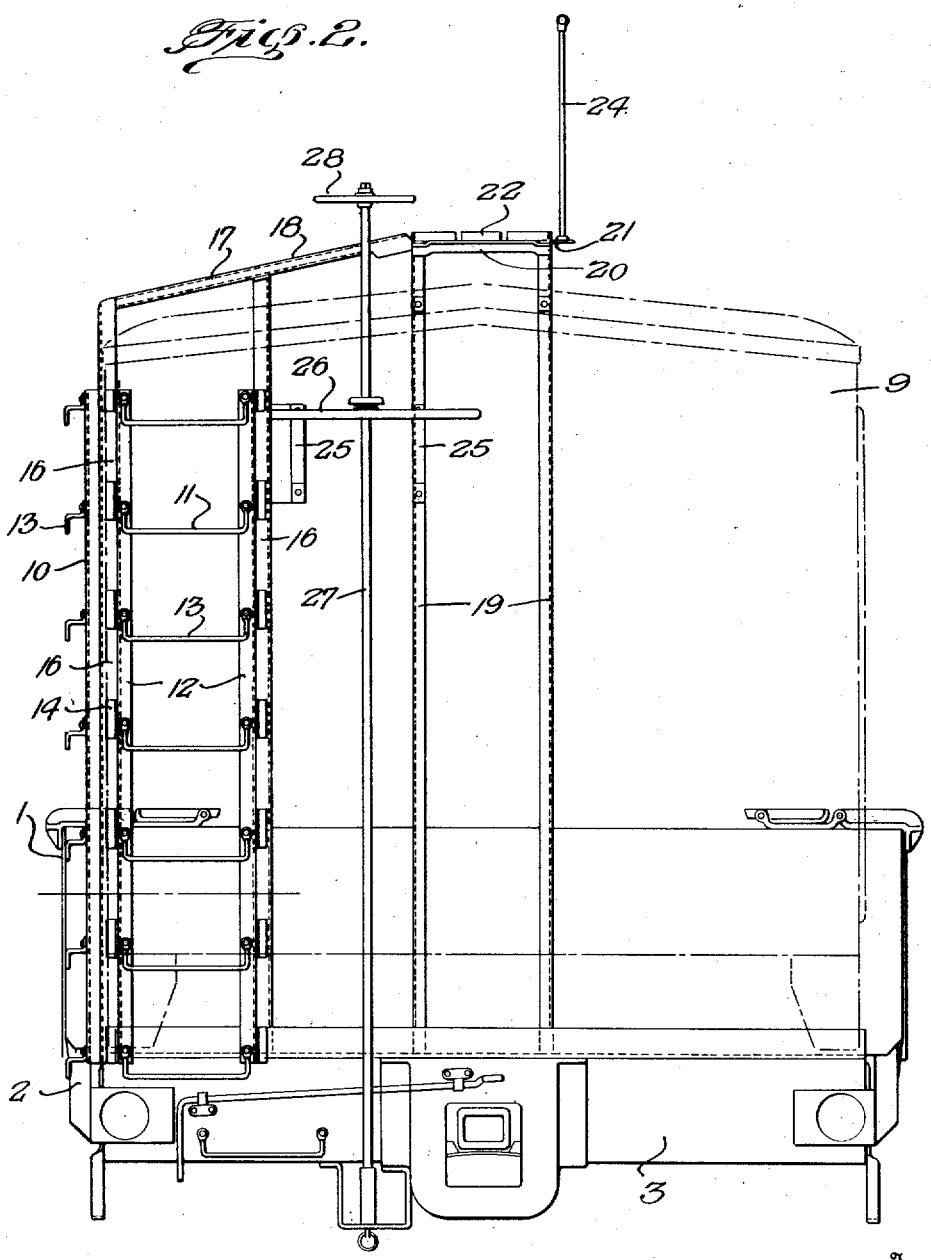
Fig. 2 is an end elevation of the car shown in Fig. 1.
Figure 3:
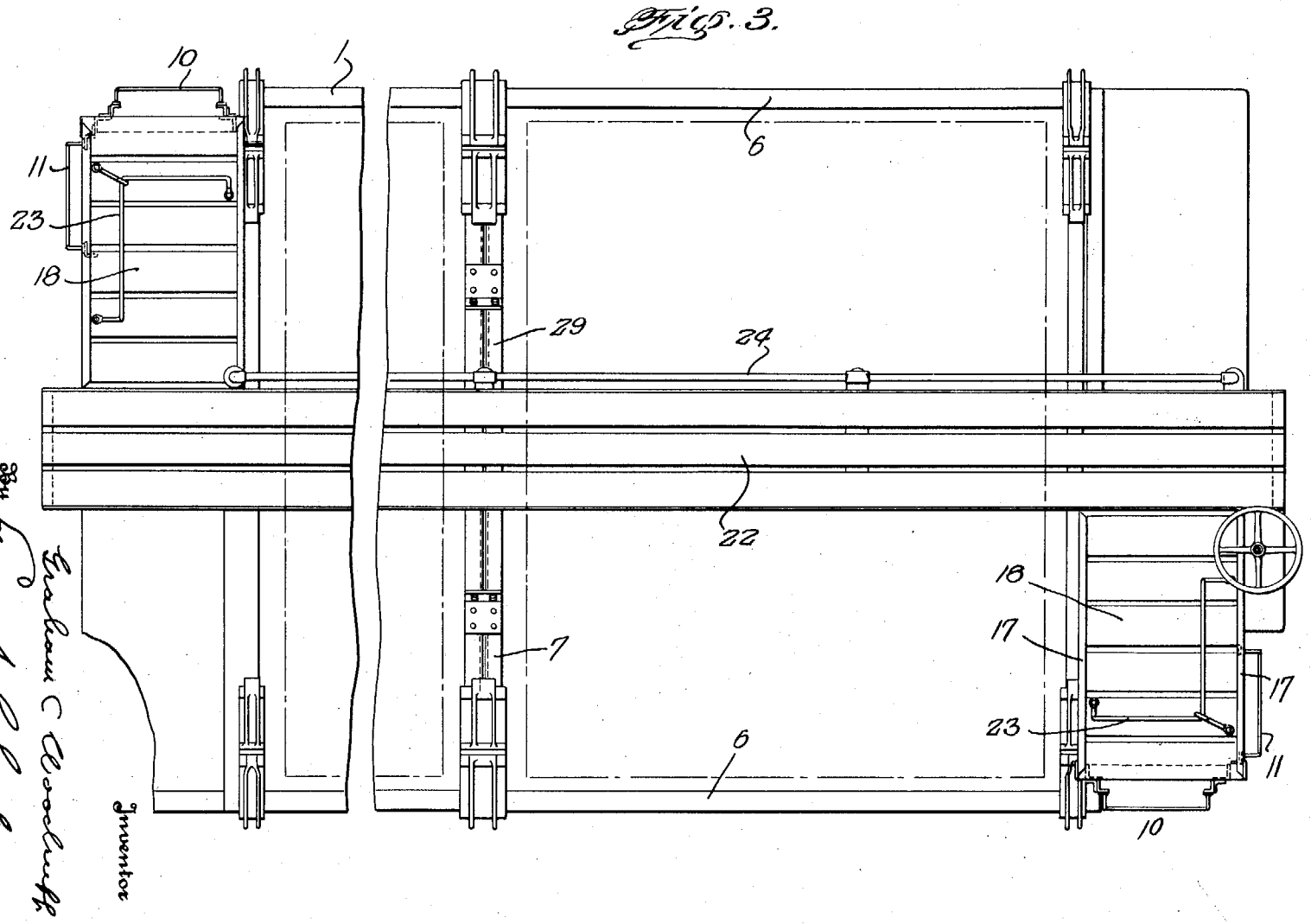
Fig. 3 is a top plan view of the same.
Figure 4:
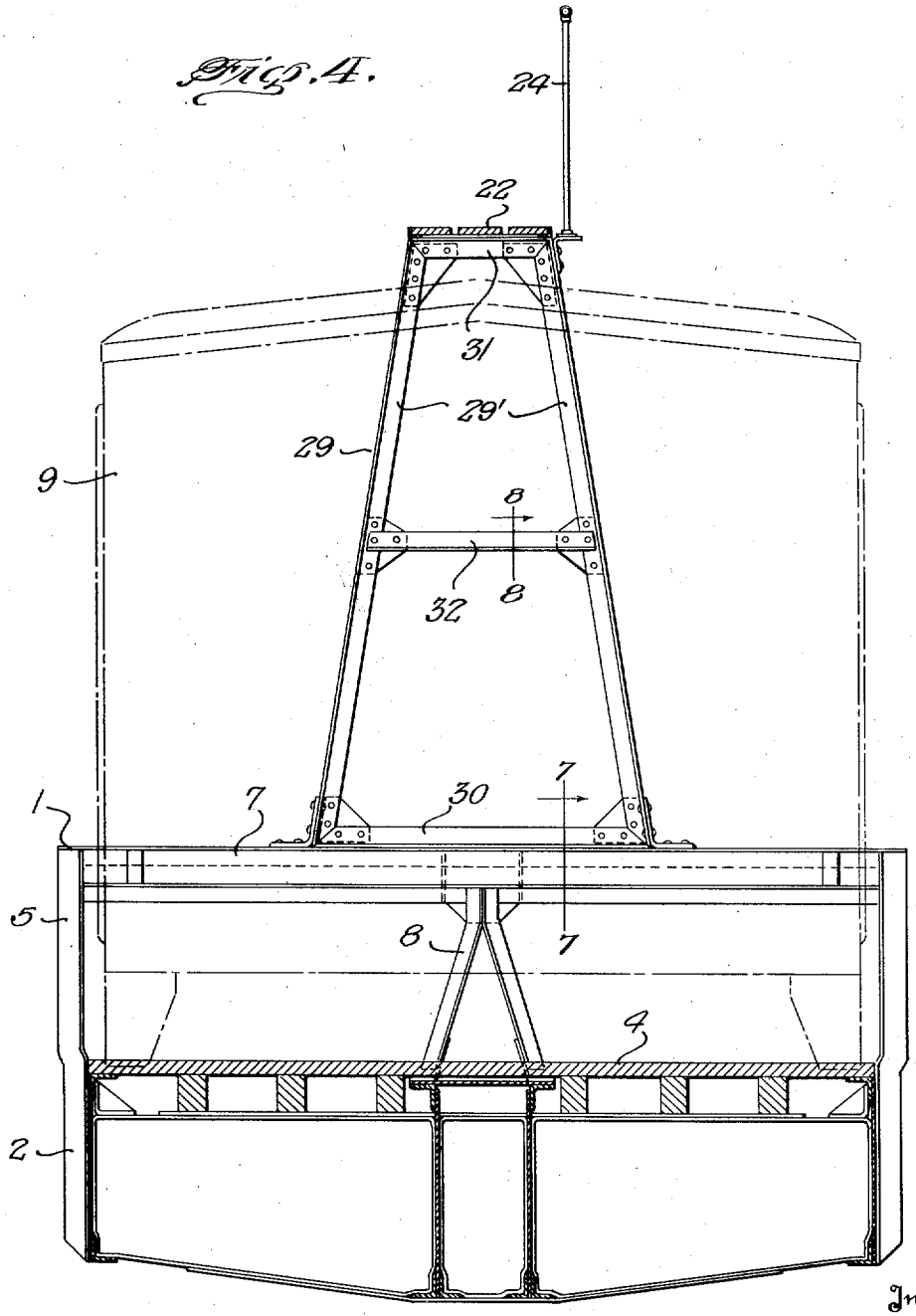
Fig. 4 is a vertical transverse section through the car.
Figure 5:
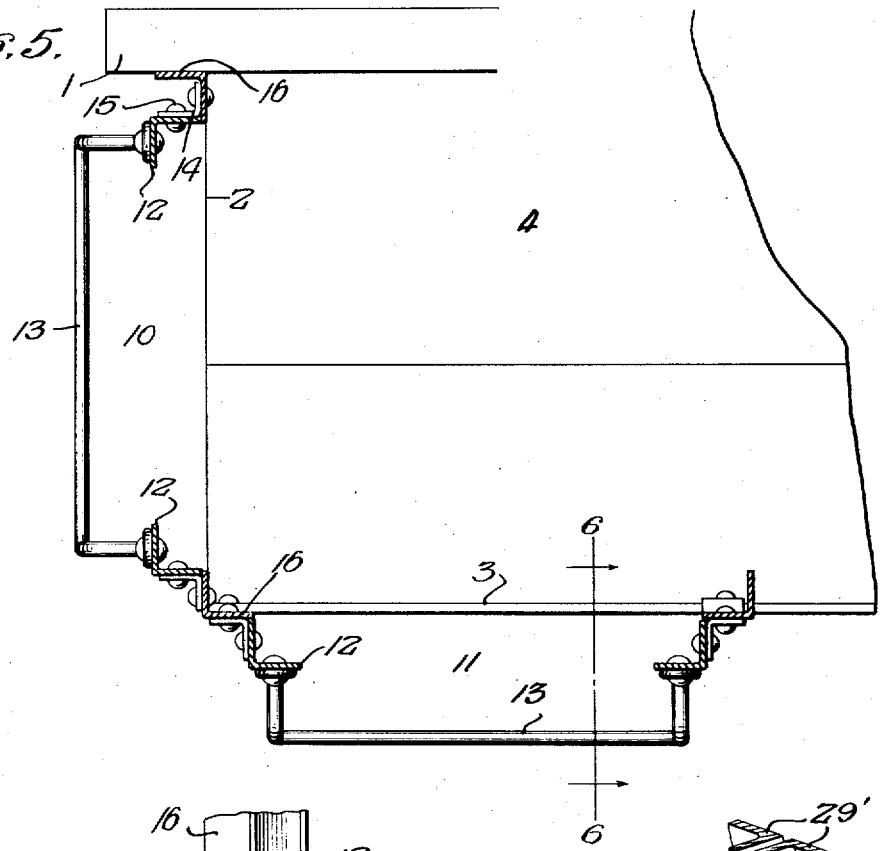
Fig. 5 is an enlarged horizontal section on line 5—5 of Fig. 1.
Figure 6:
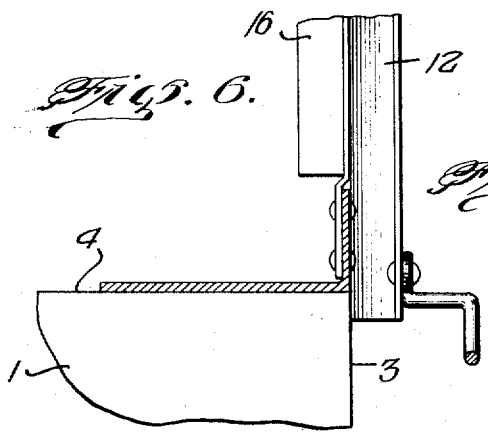
Fig. 6 is an enlarged vertical section on line 6—6 of Fig. 5.
Figure 7:
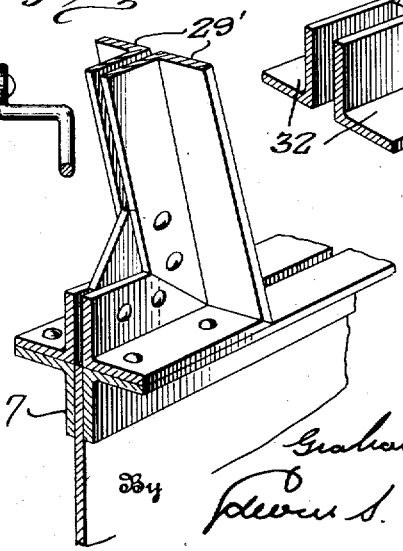
Fig. 7 is a detail section in perspective on line 7—7 of Fig. 4.
Figure 8:
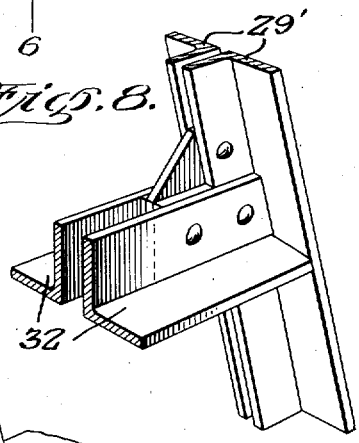
Fig. 8 is a similar view on line 8—8 of Fig. 4.

In the practical embodiment of the invention as disclosed in Figs. 1 to 8, inclusive, 1 designates a freight car of drop-side gondola or open-top type including side and end sills 2 and 3, a floor 4, spaced angle metal uprights 5 arranged in alined pairs at opposite sides of the car and bolted or riveted to the side sills, and drop door 6 of suitable type arranged in the spaces between the uprights 5 at each side of the car. The alined pairs of uprights 5 at opposite sides of the car may be connected by transverse angle metal brace bars 7 arranged at a suitable elevation above the floor 4 and spaced therefrom by braces 8, the bars 7 and braces 8 forming openwork bulk-heads or partitions arranged at intervals along the length of the car and providing with the doors 6 compartments for the reception of the removable freight containers 9, which may be of any of the constructions commonly employed. The containers may be fastened in position in their compartments in any preferred manner so as to prevent them from shifting, or they may be held from shifting by the bulk-heads and the drop doors. The car may be provided or not with fixed end walls which, when used, may form the outer end walls of the end container compartments, but, when side ladders are employed, fixed end walls may be dispensed with and the bulk-heads forming the outer end walls of the end compartments may terminate a suitable distance inwardly from the end sills, to allow proper space for the use of side ladders without interfering with the transfer of containers to and from the end compartments. The drop door 6 may be arranged to drop down to a horizontal position without and to serve as gangways or transfer platforms over which the containers may pass between the container compartments and a loading platform at a station, or the doors may be adapted to drop fully down to vertical position, in which event gangways or loading platforms separate from the doors may be used.

In the structural organization illustrated in Figs. 1 to 6, inclusive, a side ladder 10 and an end ladder 11 are employed at each end of the car and on opposite sides of the longitudinal center of the car at the opposite ends thereof. Each ladder structure comprises a pair of L-shaped angle metal side bars or rails 12 and rod-like rungs 13 connecting the same, said bars or rails 12 being united by bracket plates 14 and bolts or rivets 15 to similarly shaped upright frame bars 16 fastened at their lower ends by the rivets to the side or end sill, as the case may be, and said bars 16 extending beyond the upper ends of the ladder rails and to a suitable level above the level of the top of the container and being united at their upper ends to the angle metal side rails 17 of a transverse running board 18. A single frame bar 16 may be employed between the adjacent rails 12 of the ladders 10 and 11 to which said rails are fastened, instead of employing a separate frame bar for each rail, as shown particularly in Fig. 5.

Also arranged at each end of the car and slidably secured at their lower ends to the end sill or other parts of the car frame are intermediate frame bars 19 which are secured at their upper ends to the end and side frame rails 20 and 21 of a longitudinal running board 22, which is suitably united to the frame rails of the adjacent transverse running board at each end of the car. The platforms 18 and 22 may be provided with suitable guard railings 23 and 24, and the guard railing 23 may be formed in part by a grip bar arranged to be readily grasped by a trainman passing to or from the ladder 10. If desired the frame bar 25 and adjacent frame bar 16 may carry supporting brackets for a foot board or platform 26 through which a hand brake shaft 27 may extend and in which said shaft may be journaled, which platform will serve as a support on which a brakeman may stand while actuating the brake shaft hand wheel 28. In order to rigidly support the platform 18 throughout its length upright angle metal frame members or supports 29 are provided between the end frame supports, which frame members 29 may be carried by the cross bars 7 and consist of angle metal bars 29′, connected by bottom, top and intermediate braces 30, 31 and 32, and suitably fastened at its lower and upper ends to the cross bar 7 and the ladder frame. This arrangement also adapts the board or platform 26 to form a bracing connection between the ladder and running board frame members, thus increasing their strength, and the platform 26 may serve as a step for the convenience of a trainman in stepping up and down between the ladder 11 and the platforms 18 and 22, in which operation the hand wheel 28 may be used as a holdfast or grip element.

It will be seen that the construction of parts described provides at each end of the car side and end ladder frames which are mutually stayed and braced and are arranged to allow a trainman to ascend or descend from the running boards from the side or end of the car, and which ladder frames also form supplemental parts of a framing which supports the longitudinal and transverse running boards at a proper elevation above the containers 9, so that a trainman may pass from end to end of the car or stand at either end of the car at a suitable elevation to operate the hand brake gear or to perform other customary services, the construction and arrangement of ladders and running boards giving a full complement of safety appliances complying in all respects with safety appliance requirements as promulgated for box and other house cars. The construction described further allows the provision of a very light but strong and durable framework and ladder and running board arrangement which does not add an undue amount of additional weight to the car, and which permits free transfer of the containers 9 to and from their compartments without interference from the ladders or running boards or any parts thereof. The guard railings 23 and 24 may be omitted, if desired, or modified to comply with safety requirements while giving all necessary top clearance.

Figure 9:
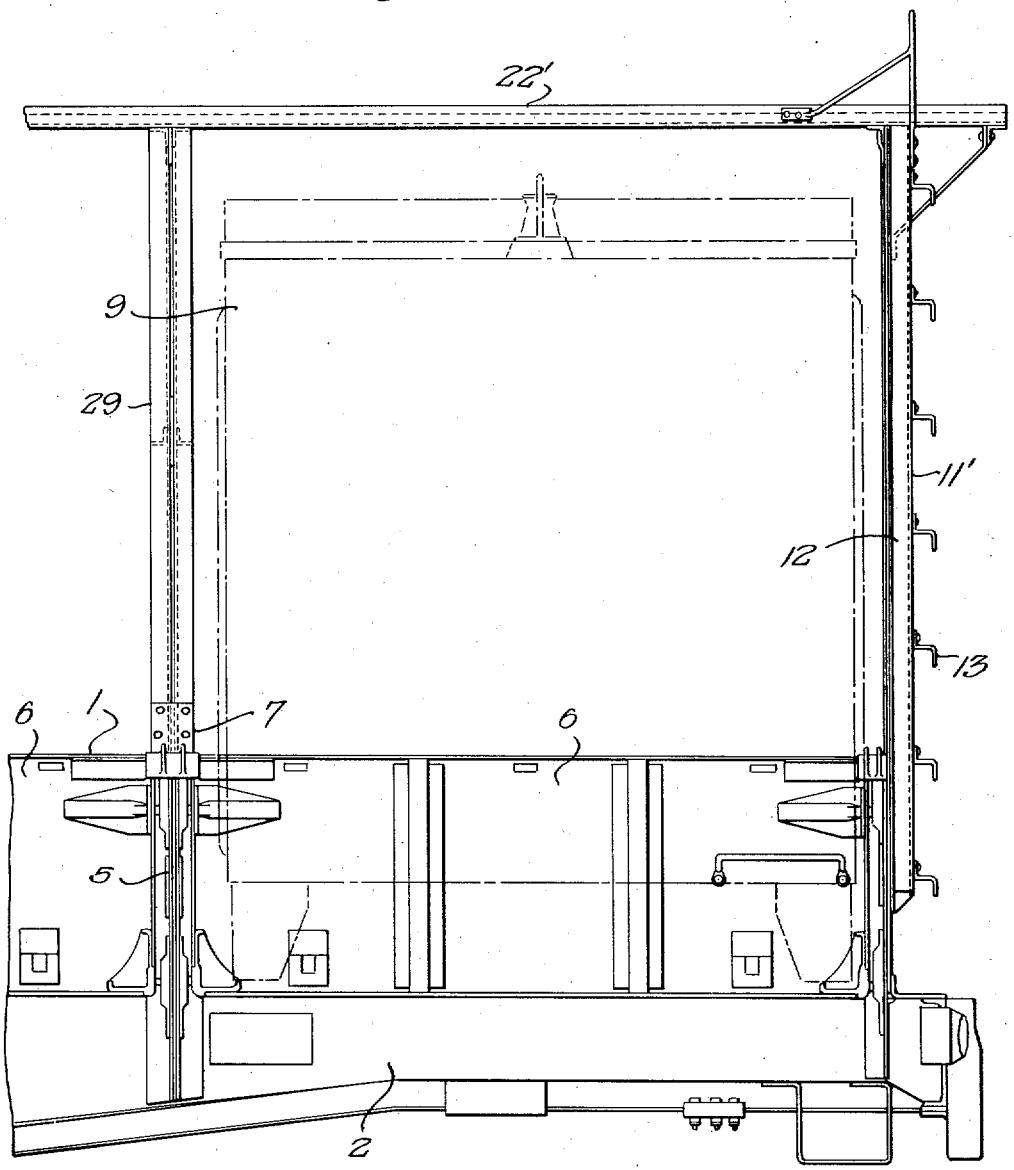
Fig. 9 is a view similar to Fig. 1 showing a modified construction of end ladder and longitudinal running board arrangement.
Figure 10:
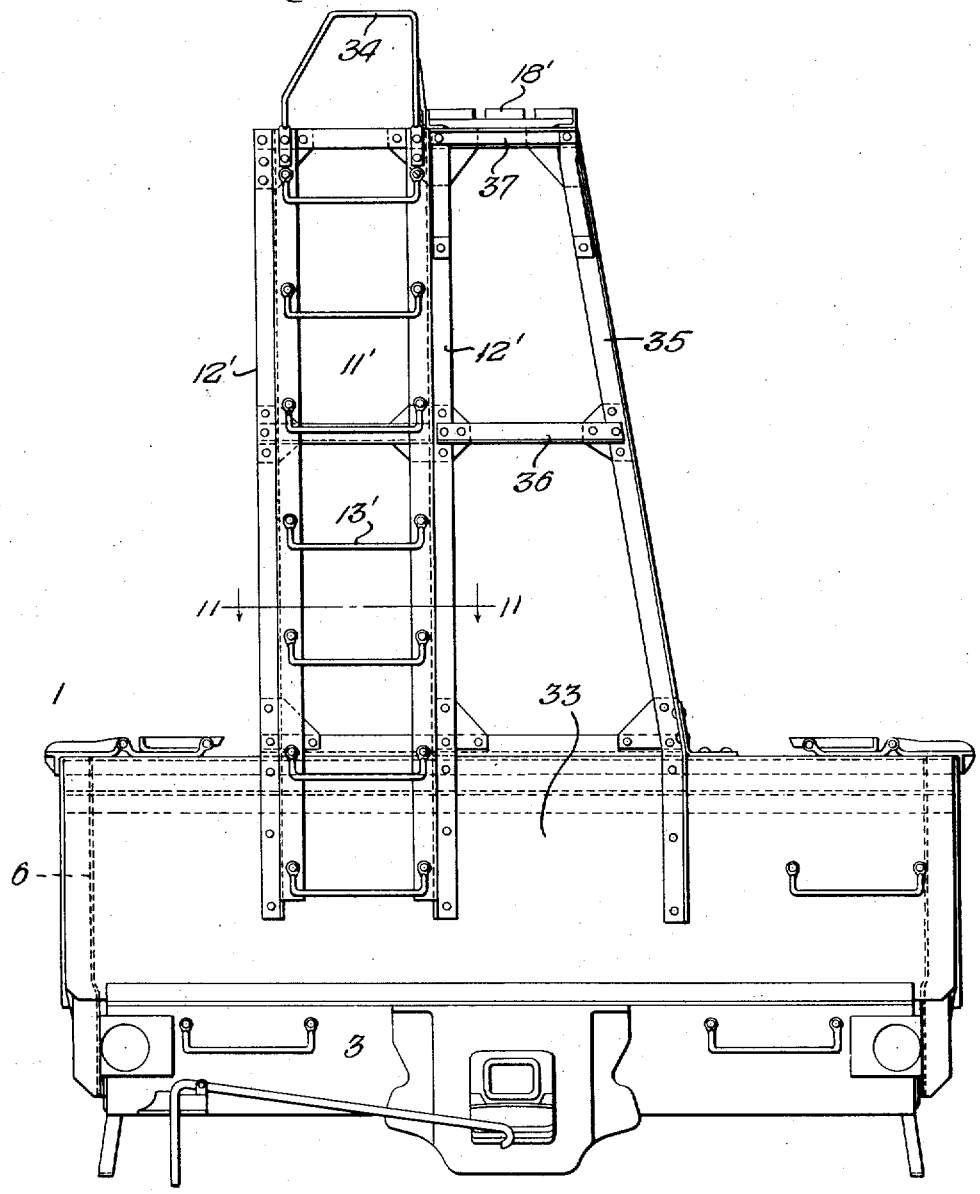
Fig. 10 is an end elevation of the same.
Figure 11:
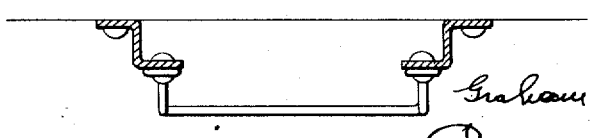
Fig. 11 is a section on line 11—11 of Fig. 10.

In the modified construction shown in Figs. 9, 10 and 11 the use of side ladders and transverse running boards is dispensed with and a specifically different construction of means provided for mounting the end ladders and the longitudinal running board. As shown, a pair of Z-shaped frame bars 12′ are secured at their lower ends to a fixed end wall 33 of the car and projected upwardly therefrom and from the side rails of the end ladder 11′ to which the rungs 13′ and an upper holdfast or grip member 34 are connected. Also secured to and extending upwardly from the wall 33 is a frame bar 35 connected with the adjacent rail 12′ by cross braces 36 and 37 and form therewith, and with intermediate uprights or frame supports 29, as previously described, a frame support for a longitudinal running board 22′ and to which the rails of said running board are suitably fastened. A ladder and frame structure of this character is provided at each end of the car for cooperation with the intermediate supports 29 to carry the running board 18′ which is disposed at a suitable elevation above the containers 9, the end ladders and the running board and its supports being arranged so as to offer no obstruction to the free and unimpeded passage of the containers to and from the container compartments of the car in loading and unloading operations. The structure in this case is also such as to provide end ladders and a longitudinal running board which may be made of requisite strength and durability without materially increasing the fixed load weight of the car.

It will be seen that the upper ends of the end and side ladders at each end of the car and the associated transverse running board or platform lie substantially in the horizontal plane of the tops of the containers or at such level relative thereto that a trainman, when desired or in case of necessity, may step from a ladder or transverse running board onto the top of the adjacent container and use the tops of the containers as a running board in place of the running board 22 or 22′. In such use of the ladders and container tops the running board 22 or 22′, if used, and built with or without a railing 24, will serve as a safety guard conveniently accessible to the trainman.

From the foregoing description, taken in connection with the drawings, the construction, mode of operation and advantages of the improved safety appliance for container cars of the character described will be readily understood and appreciated without a further and extended description, and it will be seen that a simple, reliable and efficient type of safety appliance is produced for the purpose which does not in any manner interfere with the normal use of the car. While the structural organizations disclosed are preferred, it is to be understood, of course, that changes in the form, construction and arrangement of parts may be modified or varied within the scope of the appended claims, without departing from the spirit or sacrificing any of the advantages of the invention.

What I claim is:—

1. An open-top container car having a space for the reception of a removable freight container and provided with a running board bridging over such space.

2. A container car having a longitudinal series of container receiving compartments, and a running board bridging over the series of compartments.

3. A container car having a longitudinal series of container compartments, partitions between the compartments, a running board bridging over the compartments and supported at the ends of the car, and supports for the running board connected with said partitions.

4. An open-top, drop-side container car having container receiving spaces, and a running board bridging over said spaces.

5. An open-top drop-side container car having container receiving spaces, a running board bridging over said spaces, and a ladder leading to the running board.

6. A container car having container receiving spaces, each open at the top and a side, closures for the open sides of the container spaces, and a running board extending longitudinally of the car over the container receiving spaces.

7. A container car having container receiving spaces, each open at the top and a side of the car, closures for the open sides of the container receiving spaces, a running board extending longitudinally over said container receiving spaces, and ladders leading to the running board.

8. A container car having container receiving spaces, each open at top and a side, closures for the open sides of the container receiving spaces, a running board extending over the container receiving spaces, ladders at the ends of the car leading to the running board, and supports for the running board between the container receiving spaces.

9. A container car having container receiving compartments, each open at the top and a side, closures for the open sides of the compartments, bulk-heads separating the compartments from each other, a running board extending over said compartments, ladders at the ends of the car leading to the running board, and supports for the running board extending between the running board and the bulk-heads.

10. A container car having container receiving spaces, a running board extending longitudinally of the car over said spaces, and supporting frames at each end of the car for the running board forming ladders leading thereto.

11. A container car having container receiving compartments, a running board extending longitudinally over said compartments, and side and end ladders at each end of the car leading to said running board.

12. A container car having container receiving compartments, a running board extending longitudinally over said compartments, transverse running boards at each end of the car, and side and end ladders at each end of the car leading to the running boards.

13. A container car having container receiving compartments, drop doors at the sides of the compartments, a running board extending over said compartments longitudinally of the car, and an upright frame at each end of the car supporting a platform and forming ladders leading thereto.

14. A container car having container receiving compartments, drop sides for said compartments, a running board extending longitudinally over the compartments, upright frames at each end of the car supporting the running board and forming ladders leading thereto, and supports between compartments for the running board.

15. A container car having container receiving compartments, drop sides for the compartments, ladders extending upwardly from the car adjacent to but beyond the end compartments, and a running board extending over the compartments and supported by said ladders.

16. An open-top container car constructed for the reception of a removable freight container with its top exposed at a level above the car body, and provided with a ladder extending upwardly to a level in such relation to the level of the container top as to allow a trainman to conveniently step from the ladder onto the top of the container, or vice versa.

17. An open-top container car having means for holding removable freight containers with their tops exposed and disposed above the level of the body of the car, and a ladder at an end of the car and extending therefrom upwardly to substantially the level of the tops of the containers.

18. An open-top container car having means for supporting removable freight containers with their tops exposed and terminating at a common level above the body of the car, a longitudinal runway supported by the car and extending centrally over the containers, a ladder extending upwardly from the car at a side of the longitudinal center of the car to substantially the level of the tops of the containers, and a platform at the top of the ladder disposed alongside the runway.

19. An open-top container car having means for supporting removable freight containers with their tops exposed and arranged at a level above the level of the body of the car, a ladder at each end of the car extending upwardly therefrom to substantially the level of the container tops, and a supporting surface arranged to permit a trainman to conveniently pass from the ladder to the container tops and vice versa.

20. An open-top container car having means for holding removable freight containers with their tops exposed and disposed above the level of the body of the car, a ladder on the car extending upwardly therefrom to substantially the level of the tops of the containers, and a platform at the top of the ladder.

21. An open top freight car, provided with a ladder at each end extending upwardly above the top of the car to approximately the permissible height of the lading in the car above the top of the car.

Signed at Bronxville, N. Y., this 16th day of November, 1931.

GRAHAM C. WOODRUFF.